United States Patent [19]
Clauss et al.

[11] Patent Number: 5,950,530
[45] Date of Patent: Sep. 14, 1999

[54] ARRANGEMENT AND PROCESS FOR THE SECURING OF TWINE ENDS

[75] Inventors: Steffen Clauss, Dellfeld; Steffen Budach, Saulgau, both of Germany

[73] Assignee: Deere & Company, Moline, Ill.

[21] Appl. No.: 09/073,806

[22] Filed: May 6, 1998

[30] Foreign Application Priority Data

May 16, 1997 [DE] Germany .......................... 197 20 542

[51] Int. Cl.⁶ ........................... A01F 15/14; B65B 13/24
[52] U.S. Cl. ..................... 100/2; 100/5; 100/13
[58] Field of Search ................ 100/2, 3, 5, 13, 100/88; 56/341; 206/83.5

[56] References Cited

U.S. PATENT DOCUMENTS

| | | | |
|---|---|---|---|
| 1,848,254 | 3/1932 | Johnson | 100/13 |
| 2,085,082 | 6/1937 | Delany | 100/13 |
| 4,150,614 | 4/1979 | Schwartz | 100/13 |
| 4,248,143 | 2/1981 | Gaeddert | 100/13 |
| 4,354,429 | 10/1982 | Boldenow et al. | 100/13 |
| 4,557,189 | 12/1985 | Schaible | 100/13 |
| 4,796,524 | 1/1989 | Renaud | 100/13 |
| 5,012,733 | 5/1991 | Staudinger | 100/13 |

FOREIGN PATENT DOCUMENTS

| | | | |
|---|---|---|---|
| 0159953 | 10/1985 | European Pat. Off. | 100/3 |
| 41 32 664 | 4/1993 | Germany . | |

*Primary Examiner*—Stephen F. Gerrity

[57] ABSTRACT

A device is provided for tucking or inserting the free end portion a length of twine, just severed from a supply roll, under one or more wraps of the length of twine extending about the circumference of a bale located in a bale chamber of a large round baler.

8 Claims, 4 Drawing Sheets

ARRANGEMENT AND PROCESS FOR THE SECURING OF TWINE ENDS

BACKGROUND OF THE INVENTION

The invention concerns an arrangement for the securing of the ends of twine on a round bale after twine is wrapped about the circumference of the bale.

Cylindrical balers produced in so-called large round balers are prevented from falling apart by feeding twine onto the surface of the bale while it is kept rotating in the baling chamber thereby applying a large number of layers of twine onto the cylindrical bale which remain about the circumference of the bale on the basis of friction. After completing the binding of the cylindrical bale, the twine is cut off from a supply roll and the end of the twine remains to hang loosely on the circumference of the cylindrical bale. Depending on the direction in which the bale is subsequently rolled, after it is ejected or during the handling of the ejected bale, the ends of the twine may become unwrapped from the bale which can lead to the bale falling apart.

DE-C2-41 32 664 discloses a round baler that is equipped with an arrangement for securing the loose twine ends. According to one of the solutions presented there, the twine end is secured by means of an adhesive tap, and, according to another solution, the loose twine end is inserted into the bale.

The problem underlying the invention, is seen in the fact that the known solutions of securing twine ends are too costly or not sufficiently secure.

SUMMARY OF THE INVENTION

According to the present invention, there is provided an improved manner of securing twine wrapped about the circumference of a round bale.

A broad object of the invention is to provide an arrangement for inserting or tucking the free end of a length of twine under previously laid wraps of the twine in order to secure the twine in place.

A more specific object of the invention is to provide an arrangement as set forth in the previous object wherein a finger is pivotally mounted to a carrier moveable between a standby position holding the finger away from the bale and a delivery position positioning the finger against the bale, the finger then being operated in response to cutting of the twine from a supply roll so as to pivot sideways and insert the twine end under the previously laid wraps of twine.

Still a more specific object of the invention is to provide an arrangement as set forth in the immediately preceding object wherein the finger is connected to a driver which engages the bale and is moved by the rotating bale to cause the finger to pivot sideways to tuck or insert the twine end under the previously laid wraps of twine.

Another specific object of the invention is to provide a latch mechanism in combination with the connection between the driver and the finger, the latch mechanism acting to prevent the finger from pivoting sideways until the wrapped twine is cut to separate it from the roll of twine carried by the baler.

These and other objects will become apparent from a reading of the ensuing description together with the appended drawings.

DESCRIPTION OF THE PREFERRED EMBODIMENT

Figure 1:
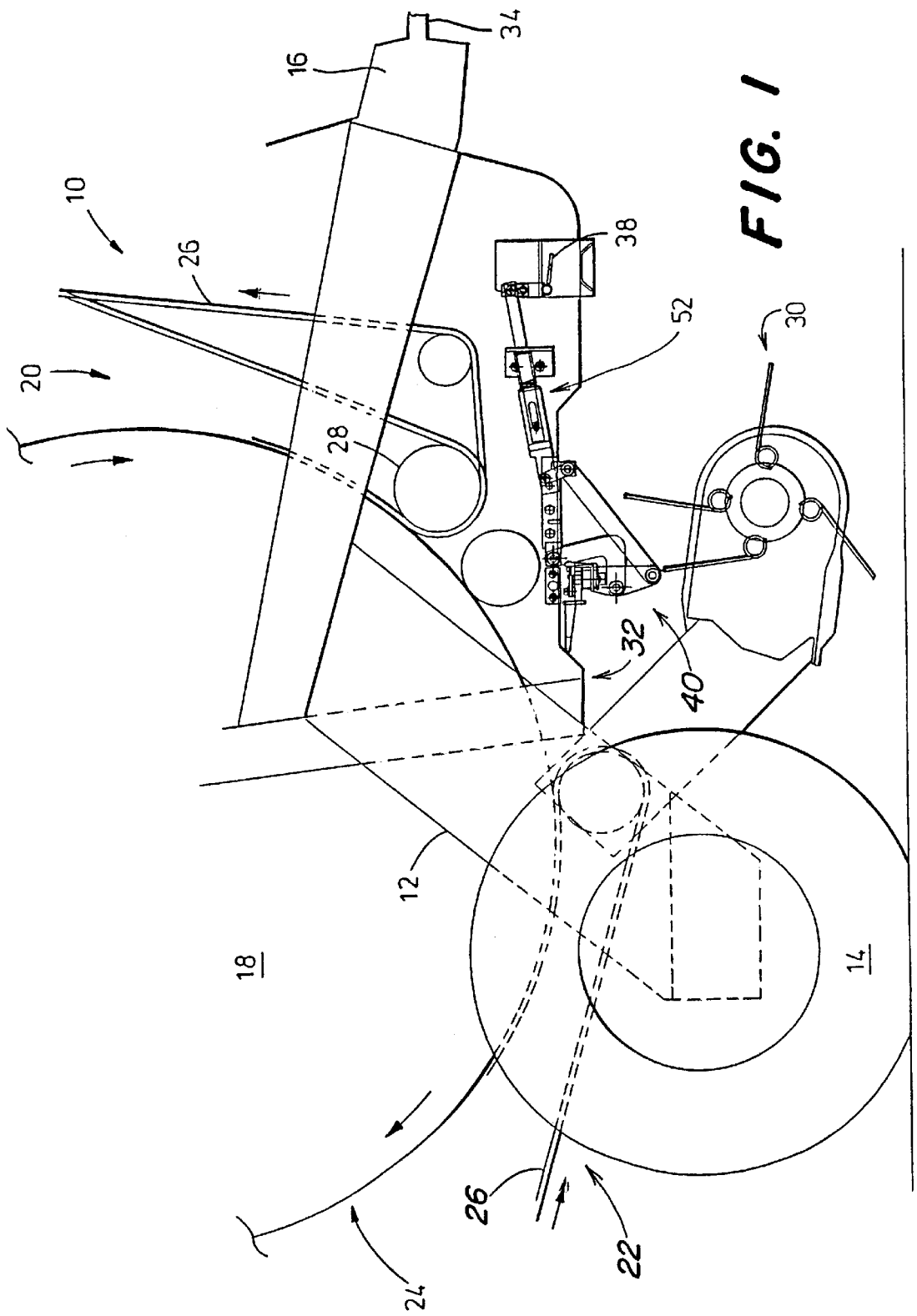
FIG. 1 is a somewhat schematic side elevational view of a round baler with an arrangement, constructed in accordance with the present invention, for securing wrapped twine on a bale by inserting or tucking the end of the twine underneath previously laid wraps of twine.

FIG. 1 shows a round baler 10 that is provided with a frame 12 supported on wheels 14 for free movement over the ground when towed by a prime mover, not shown, having its drawbar hitched to a connector 34 at the forward end of a tongue 16 forming a forward projection of the frame 12.

The frame 12 is composed of a fixed forward part 20 and a discharge gate 22, that is attached for swinging about a transverse axis defined by pivot joints, not shown, located at upper rear locations of the forward part 20, so as to enable the bale 18 to be ejected from a baling chamber 24, in which it was formed. The frame 12 includes opposite vertical side walls, not described further, the distance between which is bridged by a plurality of side-by-side mounted bale-forming belts 26, that are guided over a plurality of belt support rolls 28, the belts and side walls cooperating to form the baling chamber 24. In place of, or in addition to the belts 26, rolls or chains may be provided. In a region ahead of the wheels 14, a crop pickup 30 is provided for collecting crop lying on the ground and introducing it into the baling chamber 24 by way of a chamber inlet 32.

The bale 18 is comprised of crop wrapped radially outwardly in a spiral about a loose or firm crop core, and at the end of its formation, is bound by twine 36, (see FIG. 2) through the operation of a binding arrangement, not shown, that acts to feed the twine such that it wraps the circumferential surface of the bale 18 as the bale rotates in the baling chamber 24, as is well known. For this purpose, the twine 36 is brought to the surface of the bale 18 through the inlet 32, by means of a tube-shaped twine arm or the like, and is guided in a helical path over the entire width of the bale. After a sufficient number of windings have been applied to the bale 18, which prevent it from falling apart after leaving the baling chamber 24, the binder arm is brought to a certain position and the twine 36 is cut by means of a knife 38. This position may be at any location, but is most often in the region of one of the side walls of, or in the longitudinal center of, the baling chamber 24. Furthermore, several twine arms may be provided so that several strands of twine may be applied. With respect to the binding process, it should be noted that the twine 36 lies relatively loosely on the bale 18 as long as the bale is compressed by the belts 26. But as soon as the bale 18 is removed from the baling chamber 24, it expands and is in very tight contact with the twine 36. The twine 36 is drawn from a storage container, not shown, and the loose twine end is not knotted to an earlier region of the applied twine 36, as is known practice with rectangular balers.

An arrangement 40, according to the invention, to secure the fee ends of the twine is located above the crop pickup 30, horizontally in front of the inlet 32 and below the belts 26 in the forward frame part 20. In this embodiment, the arrangement 40 is attached to a side wall of the round baler 10. As can best be seen in FIGS. 3 and 4, the arrangement 40 includes a twine insertion finger 42, a finger driver 44, a locking arrangement 46 and a linkage 48, all of which are supported in bearings together on a carrier 50. In this embodiment, movement of the arrangement 40 between a lowered, stand-by position (see solid line position in FIG. 2) and a raised, twine insert position (see dashed line position in FIG. 2) is controlled mechanically by means of a linkage 52.

The arrangement 40 may also be provided at any other location at which it can bring the end sections of the twine 36 into contact with the bale 18, that is, insert it between previous strands of twine and the circumferential surface of the bale 18. After leaving the baling chamber 24, the twine 36 previously applied, is firmly in contact with the bale 18, therefore the twine ends are retained by a corresponding force in a friction lock and cannot be rolled out of place when the bale 18 is rolled. Reliable binding of the bale 18 is thus assured.

Figure 3:
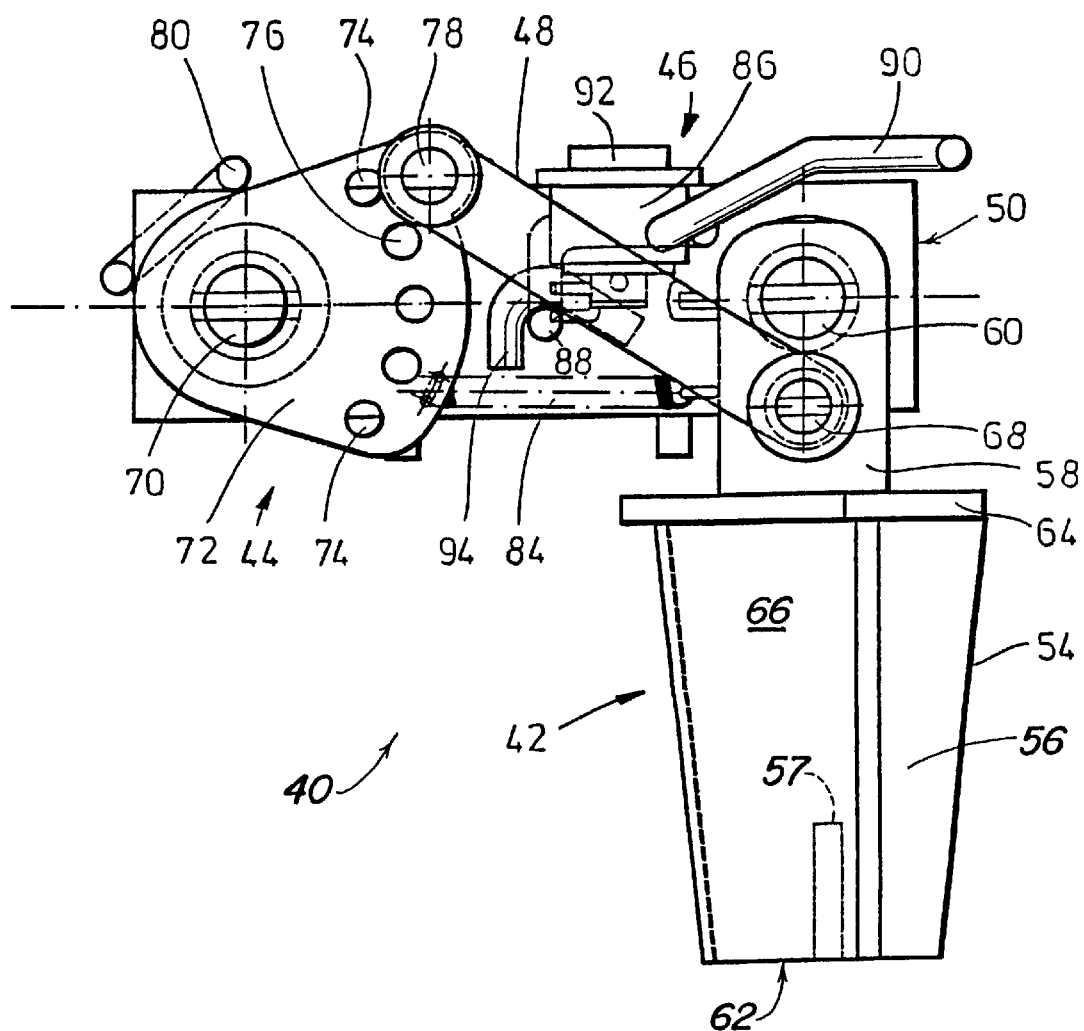
FIG. 3 is a top plan view of a section of the arrangement as it would appear to a viewer standing behind and looking down on the arrangement.
Figure 4:
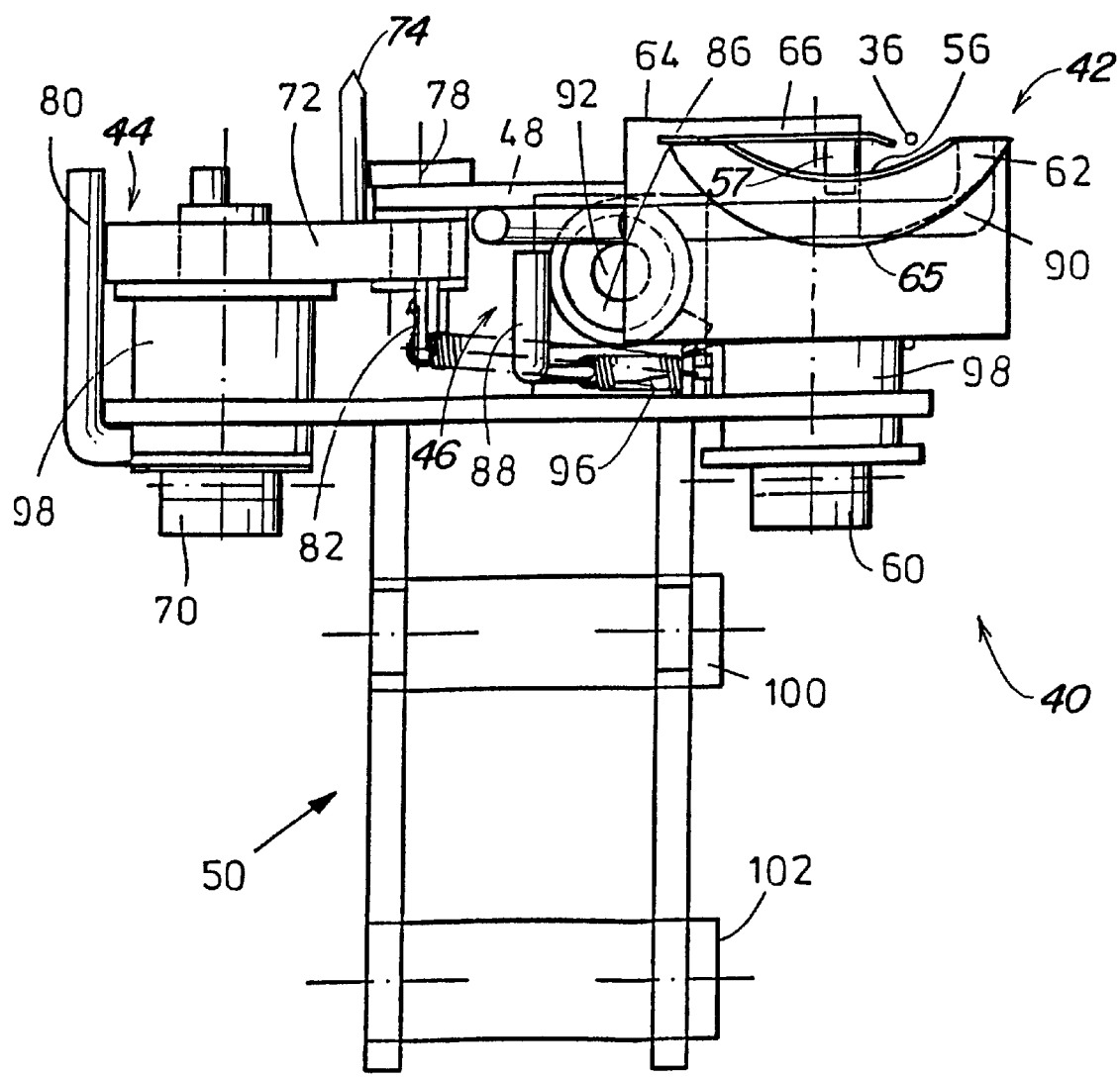
FIG. 4 is a rear elevational view of the arrangement shown in FIG. 3.

The arrangement of the twine insertion finger 42 can be seen clearly in FIGS. 3 and 4, and includes a sliding member 54 with a twine guidance groove 56 having a twine stop 57 located in a forward bottom location thereof, a pivot arm 58 and a pivot shaft 60 that are all together configured as a unit. The sliding member 54 consists of a tongue 62, which tapers towards its rearward free end from its other end which is fastened to a vertical panel 64. At its lower surface 65, as seen in FIG. 4, the tongue 62 is rounded, since this end slides beneath the strands of twine that lie on the bale 18, so that these are not damaged. The twine guidance groove 56 is machined into the upper side and takes the form of a throat and is partially covered by a protector 66. The yarn guidance groove 56 extends in the direction of the longitudinal centerline of the tongue 62 from the panel 64 to the opposite end. The twine stop 57 acts to prevent the twine 56 from moving to one side of the groove 56 beyond the bottom of the groove.

The pivot arm 58 connects the sliding member 54 with the pivot shaft 60 and is provided with a joint 68 for the linkage 48 that is located between the pivot shaft 60 and the panel 64.

In this embodiment, the pivot shaft 60 extends essentially perpendicular to the principal extent of the tongue 62 and is supported in bearings, free to rotate, in the carrier 50.

Figure 2:
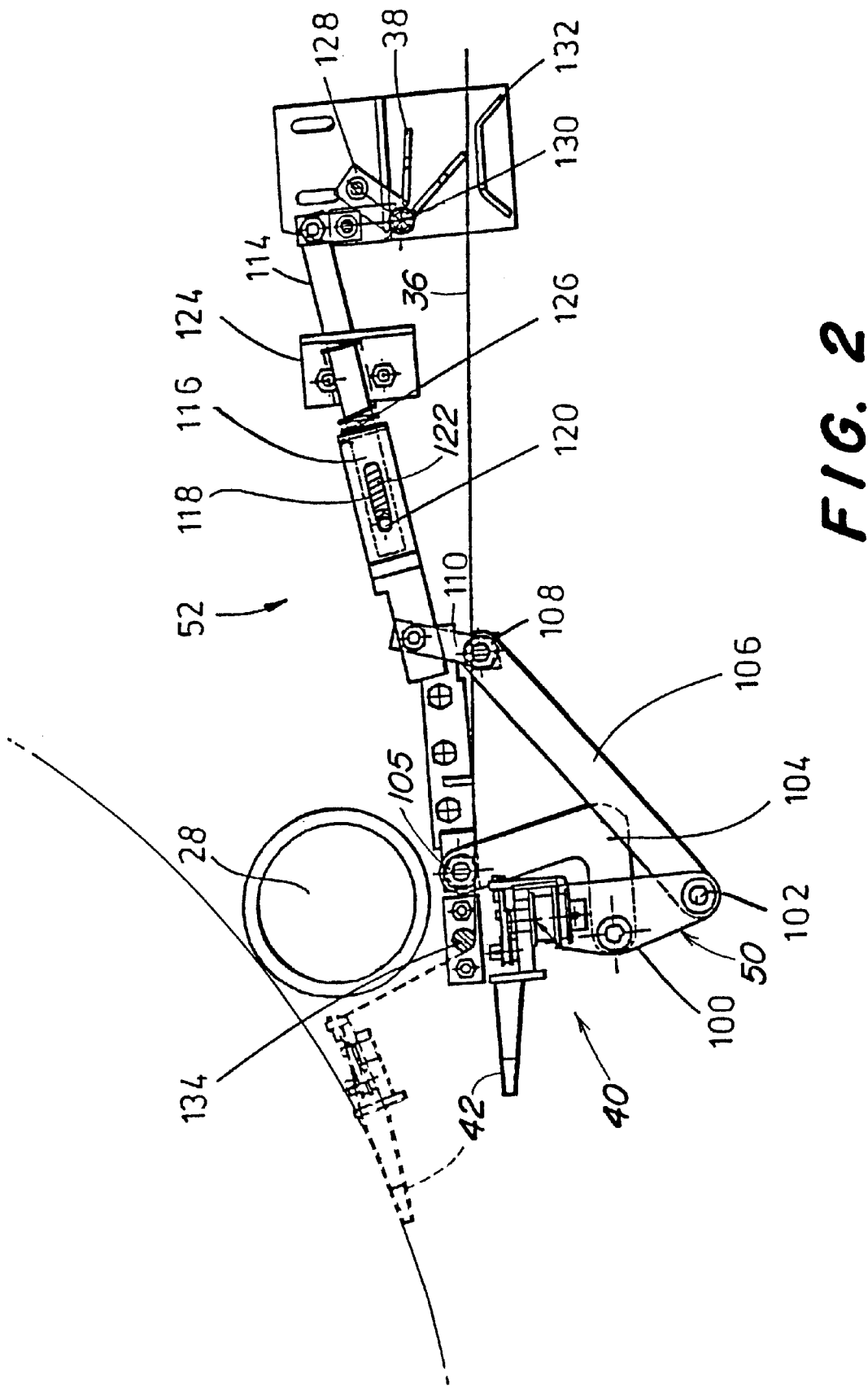
FIG. 2 is a side view of the arrangement separated from the round baler, with the finger carrier being shown in solid lines in a lowered stand-by position, and being shown in dashed lines, in a raised twine insert position.

The driver 44 is supported in bearings, free to rotate, by means of the pivot shaft 70 in the carrier 50 and is provided with a plate 72 and, in this embodiment, two grippers 74. The driver 44 is provided in order to move the finger 42 between a first position, wherein its principle extent is directly rearwardly, as shown in FIGS. 1 and 2, and a second position, not shown, wherein its principle extent is towards the side of the baling chamber 24. Specifically, the pivot shaft 70 extends parallel to the pivot shaft 60 and is thereby essentially oriented vertically, while its inclination may change due to its support in the carrier 50 with the movement of the latter. The plate 72 has the shape of a segment of a circle, hence it is essentially triangular and is retained eccentrically on the pivot shaft 70. The tapering part of the plate 72 engages the pivot shaft 70 while the radially outer rim region is provided with several bores 76 in which one or several grippers 74 are retained. In the corner region of the plate 72, located upward in FIG. 3 and located away from the pivot shaft 70, the linkage 48 is connected in a joint 78, free to pivot. The joint 78 of the linkage 48, at the plate 72, is thereby located to one side of an imaginary line connecting the two pivot shafts 60 and 70, and the connection of the plate 72, the linkage 48 and the finger 42 so as to form a crank mechanism. A stop 80 is provided in the region of the pivot shaft 70 on the carrier 50 with which the plate 72 and defines a counterclockwise limit to the angular position of the plate about the pivot shaft 70. On the lower side of the plate 72, in the region of the bore 76, in particular, in the corner region located opposite the joint 78, a retainer 82 is provided for a spring 84, configured as an extension spring, which acts so as to assure that the plate 72 is in contact with the stop 80 as long as it is not moved by other forces. The purpose of the stop 80 and the spring 84 is to move the plate 72 and with it the finger 42 into a definite initial position, therefore it becomes apparent that for this purpose the stop 80 can also be located at another location and the spring 84 may also be configured as a torsion spring, compression spring, flat coil spring or in any other configuration and arranged in other ways.

The grippers 74 are configured as pins with pointed ends that are sufficiently strong to penetrate the circumferential surface of the bale 18 whereby the rotation of the bale is transferred to the plate 72 to cause it to be rotated in the clockwise direction about the pivot shaft 70. The gripper or grippers 74 extend generally perpendicular to the surface of the plate 72 and are retained in a fixed place in the bores 76. The gripper or grippers 74 extend upward as seen in FIG. 4, that is, on the side of the plate 72 facing away from the carrier 50 and is/are arranged so as not to collide with the linkage 48.

In this embodiment, the locking arrangement 46 is located between the finger 42 and the driver 44, in particular, below the linkage 48. The goal of the locking arrangement 46 is to prevent the driver plate 72 from pivoting clockwise away from the stop 80 and thereby prevent the finger 42 from pivoting sideways from its rearward orientation, as long as a securing process of the twine ends should not occur. For this purpose, the locking arrangement 46, in this embodiment, is interlocked with the knife 38 through the linkage 52. The knife 38 is actuated in a way not shown but in common practice by a twine arm when the binding process is completed and the twine 36 is to be cut off from the supply roll.

The locking arrangement 46 is a one-piece assembly consisting of a sleeve 86 to which is fixed a locking finger 88 and a twine finger 90, with the sleeve 86 being mounted on an axle 92 in bearings so as to freely pivot about the axle. The longitudinal centerline of the axle 92 extends perpendicular to the longitudinal centerlines of the pivot shafts 60 and 70. The locking finger 88 extends vertically upward, and when in an unlocked position as shown in FIG. 4, ends at a location below the linkage 48 and a hook 94 connected to it or formed onto it, so that the linkage 48 can move freely. The locking finger 88 can be pivoted into an upper, locking position, not shown, in which it enters the path of movement of the hook 94 and thereby locks the movement of the linkage 48.

The twine finger 90 is provided for controlling the movement of the locking finger 88 between its unlocked and locked positions. Specifically, the twine finger 90 extends, starting from the sleeve 86, at first over the entire length of the panel 64 and finally upward where it ends spaced forwardly of and at approximately the same height as the upper edge of the panel 64. The position and the configuration of the twine finger 90 is therefore, arranged in such a way that the twine 36 slides over it, when the twine is extending through the twine guidance groove 56 and thereby presses the twine finger 90 downward more strongly as the carrier 50 is raised to its insert position, as shown in dashed lines in FIG. 2. Due to the support in bearings of the sleeve 86 on the axle 92 and the attachment of the twine finger 90 on its one side and the locking finger 88 on its other side, when the twine finger 90 is pushed downward, the locking finger 88 is pivoted upward and enters a location behind the hook 94. Biasing the locking arrangement 46 to its unlocking position is a further spring 96 which is configured as a helical extension spring and operates between the carrier 50 and the locking finger 88.

The linkage 48 is essentially configured as a strut which is supported in bearings, free to pivot, on the pivot arm 58 in the joint 68 and on the plate 72 in the joint 78, and is provided with a hook 94 between these joints 68 and 78. The hook 94 extends generally in a horizontal plane and is attached to one side of the linkage 48. The purpose of the linkage 48 consists in the transmission of the movement of the driver 44 to the finger 42. Hence, if the finger 42 is moved, for example, by a motor or by other means, the linkage 48 may be omitted, if applicable. The hook 94 may also be integrated into the linkage 48.

The carrier 50 is provided in addition to two bearings 98, which support the pivot shafts 60 and 70, and the stop 80, with upper and lower pivot bearings 100 and 102, respectively, whose longitudinal centerlines extend perpendicular to the longitudinal centerlines of the bearings 98. Supporting the carrier 50 for movement between lower (FIG. 2) and upper positions is a four-bar linkage defined in part by an approximately J-shaped steering arm 104 having its lower rear end pivotally coupled in the upper pivot bearing 100, while its upper forward end is vertically pivotally mounted to the frame 12, at a bearing 105. The four-bar linkage is further defined by a second steering arm 106 having its rearward end pivotally coupled to the lower end of the carrier 50 by the lower pivot bearing 102, the forward end of the arm 106 being fixed against rotation to a shaft 108 that is mounted for rotating in the frame 12. Also fixed to and projecting upwardly from the shaft 108 is a lever 110, which, in turn, is connected to a rear location of the linkage 52.

The above description results in a four-bar linkage between the upper pivot bearing 100, the bearing 105, the lower pivot bearing 102 and the shaft 108. By means of this four-bar linkage, it is possible to pivot the carrier 50 with its components between a lower non-operating position and an upper operating position, as is illustrated in FIG. 2.

The linkage 52 is composed of a drive input rod 114 and a drive output rod 116, which are connected to each other and are free to move relative to each other. The connection is made by means of an elongated hole 118 in the drive output rod 116 and a pin 120 on the drive input rod 114, that engages the elongated hole 118. To avoid any play, a spring 122, configured as a compression spring, is inserted between the drive input rod 114 and the drive output rod 116, which operates in such a way that the linkage 52 is constantly forced into its shortest length. By means of this spring 122, the knife 38 can be moved so as to cut the twine even at a time when the finger 42 is already in contact with the bale 18. The possibility of changing the length of the linkage 52 is an advantage when bales of varying sizes are being produced which is the case, for example, in round balers 10 having a variable sized baling chamber such as the chamber 24.

The drive input rod 114 is guided in an angle member 124 on the frame 12 and is loaded by a further spring 126, also configured as a compression spring, which operates between the linkage 52 and the angle member 124 in such a way that the shaft 108 is pivoted counterclockwise and thereby moves the carrier 50 into its lower position.

Along with a lever 128, the knife 38 is attached to a shaft 130, which is supported in bearings, free to rotate, in the frame 12. This lever 128 is connected in a joint to the drive input rod 114 in the end region facing away from the shaft 130.

Underneath one of the belt support rolls 28 facing the arrangement 40, a guide rod 134 is provided on the frame 12, which prevents twine 36 from coming into contact with the roll 28 when the carrier 50 and hence the finger 42 is in the raised position.

Finally, an anvil 132 extends underneath the knife 38, on which the twine 36 can lie when the knife 38 is pivoted downward, in order to cut off the twine 36.

From this description there results the following operation of the arrangement 40.

Once the binder arm, not shown, has guided the twine 36 relative to the rotating bale 18 so that it is wound over the width of the bale 18 and has assumed its end position, the twine 36 extends from the bale 18, through the twine guidance groove 56, over the twine finger 90, through the gap between the anvil 132 and the knife 38 and to a supply roll within a container, not shown, located on the frame 12. When a mechanism, not shown, with whose help the binding process is to be ended, actuates the knife 38, the lever 128, the drive input rod 114 and the latter, through the spring 122 and the connection of the elongated hole 118 with the pin 120, will pull the drive output rod 116 to the right, as seen in FIG. 2, in particular, against the resistance of the spring 126. This movement of the linkage 52 pivots the shaft 108 and with it the steering arm 106 in the clockwise direction. By virtue of the four-bar linkage, the carrier 50 is moved upward, led by the J-shaped steering arm 104, until the finger 42 is in contact with the circumferential surface of the bale 18. If in this case, the knife 38 has not yet touched the anvil 132, then the drive input rod 114 moves further and compresses the spring 122, while the drive output rod 116 remains in its position.

As FIG. 2 clearly shows, in the description up to this point, the twine 36 has not yet been cut, but continues to be wound around the bale and that on its circumferential surface several windings of twine lie on top of or close to one another. When the finger 42 is in its raised position, the twine 36 slides along the guide rod 134 in spaced relationship to the neighboring belt support roll 28. In this condition, the twine 36, which is under tension, presses the twine finger 90 of the locking arrangement 46 downward and thereby the locking finger 88 upward where it engages the hook 94 on the linkage 48. Accordingly, the driver 44 and the finger 42 are in contact with the circumferential surface of the baler product 18 and the grippers 74 penetrate into its outer layers, but the finger 42 cannot move since the linkage 48 is still locked.

As soon as the knife 38 makes contact with the anvil 132 and thereby cuts the twine 36, the tension in the twine is suddenly reduced and deactivates the locking arrangement 46, that is, the locking finger 88 leaves the hook 94 and frees the linkage 48.

Now the plate 72 of the driver 44 is pivoted about or with the pivot shaft 70, by reason of the penetration of the grippers 74 into the bale 18, in the clockwise direction and thereby moves the linkage 48 to the right as seen in FIG. 3, so that the finger 42, which is sliding on the circumferential surface of the bale 18, is pivoted in the counterclockwise direction. When the connection of the driver 44, the linkage 48 and the pivot arm 58 has occupied its extended position, the finger 42 with its sliding member 54 has fully reached its position underneath the twine windings previously deposited. At this point in time, the twine end slides out of the twine guidance groove 56 and remains under the twine windings.

The plate 72 is pivoted further by reason of the penetration of the grippers 74 into the bale 18, with the joint 78 going over center resulting in the linkage 48 being pulled such that the finger 42 returns to its initial position where it is free of the wraps of twine, where they remain by reason of the contact pressure of the bale 18.

After the bale 18, which has been bound, is ejected from the baling chamber 24, the force of the spring 84, under tension, is sufficient to pull the plate 72 again back to its initial position, in which it is in contact with the stop 80. During this return movement, the finger 42 performs a back-and-forth pivoting movement which, however, is meaningless.

Finally, the spring 126 has the effect of moving the linkage 52 to the left, as seen in FIG. 2 and pivots the steering arms 104 and 106 in the counterclockwise direction, so that the carrier 50 again occupies its lower, standby position. In this situation, the knife 36 is again lifted off the anvil 132.

We claim:

1. In combination with a large round baler including a bale chamber having an inlet for permitting twine to be fed to a bale located within said chamber and a twine cut-off knife assembly including a knife mounted for pivotal engagement with an anvil for severing a length of twine, that is wrapped to form a desired number of wraps about said bale, and located adjacent said anvil, from a supply roll of twine carried by the baler, an arrangement for securing a free end of said length of twine once said cut-off knife has severed the said length of twine from said supply roll of twine, comprising: a finger having an upper twine guide surface adapted for having twine placed thereon by a twine arm during wrapping of a bale; a carrier supporting said finger for movement between a standby position, located at said inlet and outside said bale chamber, and a twine end securing position located within said baling chamber for engagement with a circumferential surface of said bale; means mounting said finger to said carrier for movement between a twine guide position, wherein said twine guide surface extends fore-and-aft, and a twine insert position, wherein said twine guide surface is oriented sideways; a carrier drive mechanism connected to said twine cut-off knife and said carrier for effecting movement of said carrier to said twine securing position in response to said cut-off knife moving toward said anvil; and a finger drive means coupled to said finger and including control means associated with said twine cut-off knife for moving said finger between its guide and insert position, in response to said twine being severed by said cut-off knife, whereby said finger moves beneath at least one of said wraps of twine to insert the cut-off twine end beneath said at least one wrap of twine to thereby secure the twine so as to prevent it from unwrapping when the bale is discharged from the bale chamber.

2. The combination defined in claim 1 wherein said finger has a twine guide groove on its upper surface for conducting twine towards the circumference of said bale located in said chamber and has a rounded lower surface adapted for moving under said at least one wrap of twine when said finger is moved sideways when said carrier is in said twine end securing position.

3. The combination defined in claim 1 wherein said carrier drive means includes a carrier drive linkage connected between said cut-off knife and said carrier so as to move said carrier from said standby position to said twine end securing position when the cut-off knife is moving towards said anvil.

4. The combination defined in claim 3 wherein said carrier is mounted on a four-bar linkage and said carrier drive linkage includes an input link coupled to said knife and an output link coupled to said four-bar linkage.

5. The combination defined in claim 4 wherein said input and output links are coupled together by a length yieldable spring-biased connection.

6. The combination defined in claim 1 wherein said finger drive means includes a finger drive plate mounted for pivoting about an upright axis; bale engaging pins mounted in said finger drive plate for contacting said bale when said carrier is moved to its twine end securing position; said plate having an initial position wherein said upright axis and said bale engaging pins are so located relative to said bale that the rotation of the bale in said chamber has a tendency to pivot said plate in a first direction about said upright axis; a finger drive link connected between said drive plate and said finger for transferring pivotal movement of said drive plate to said finger for moving the finger from its fore-and-aft extending position towards its sideways position in response to said plate pivoting in said first direction; and said finger drive control means preventing movement of said finger drive plate until the cut-off knife has severed the twine.

7. The combination defined in claim 6 where said finger drive control means includes a latch including a locking finger mounted for pivoting about an axle oriented crossways to said upright axis and a hook mounted to said finger drive link; and a twine finger, connected for pivoting together with said locking finger, located in a path taken by said length of twine when extending between said anvil and the circumference of said bale, whereby the tension in said length of twine, before being severed by said cut-off knife, acting against said twine finger for causing said locking finger to be moved to a locking position engaged with said hook, to thereby prevent said plate from pivoting away from said initial position until the twine length is severed from said supply roll of twine by said twine knife; and a biasing means connected to said drive plate for restoring the latter to its initial position once said twine length has been severed from said supply roll of twine.

8. A process of securing to a large round bale located within the bale chamber of a baler a length of twine having multiple wraps encircling said bale, comprising the steps of:

a) guiding said length of twine through a cut-off mechanism and over a guide finger;

b) cutting the length of twine at said cut-off mechanism so as to leave a free end portion extending from bale;

c) moving the finger to insert said free end portion of said twine under at least one wrap of said twine encircling said bale; and (d) retracting said finger and thereby depositing said free end portion of said twine at a location under said at least one wrap of said length of twine.

* * * * *